UNITED STATES PATENT OFFICE 2,171,838

COMPLEX METAL COMPOUNDS OF AZO DYE-STUFFS AND PROCESS OF MAKING SAME

Fritz Straub and Peter Pieth, Basel, and Hermann Schneider, Riehen, Switzerland, assignors to the firm Society of Chemical Industry in Basle, Basel, Switzerland No Drawing. Application May 12, 1937, Serial No. 142,282. In Switzerland May 14, 1936

8 Claims. (Cl. 260—150)

The present invention relates to the manufacture of azo-dyestuffs containing metal in complex union by causing agents yielding metal to react with azo-dyestuffs of the general formula

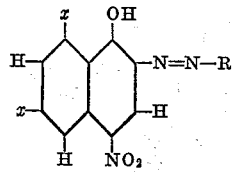

wherein one $x$ stands for a sulfonic acid group, the other $x$ stands for hydrogen, and R represents a 2-hydroxynaphthalene radical.

Azo-dyestuffs serving as parent materials for the present process can be obtained for example by coupling the diazo compounds of 4-nitro-2-amino-1-hydroxynaphthalenes containing a sulfonic acid group in 6- or 8-position with 2-hydroxynaphthalenes which may be substituted by halogens, for example, chlorine and bromine, or sulfonic groups. Such diazo compounds of the 4-nitro-2-amino-1-hydroxynaphthalene sulfonic acids can be obtained for example by nitrating the diazo compounds from, for example, 2-amino-1-hydroxynaphthalene-6-sulfonic acid or 2-amino-1-hydroxynaphthalene-8-sulfonic acid, or from 2-amino-1-hydroxynaphthalene-4:6-disulfonic acid or 2-amino-1-hydroxynaphthalene-4:8-disulfonic acid, the sulfonic acid group standing in 4-position being thereby split off, or by reduction of the nitro-group standing in 2-position, for example, in 2:4-dinitro-1-hydroxynaphthalene-6-sulfonic acid or 2:4-dinitro-1-hydroxynaphthalene-8-sulfonic acid with sulfur compounds of alkalies and alkaline earth metals which are free from oxygen, and subsequent diazotization of the 4-nitro-2-amino-1-hydroxynaphthalene sulfonic acids thus obtained.

The treatment of the azo-dyestuffs with agents yielding metal, for example with agents yielding chromium, can be carried out in an acid, neutral or alkaline medium, with or without suitable additions, for example common salt, salts of organic acids, free acids, in presence of absence of organic solvents or dispersing agents, for example, alcohol, glycerine, or pyridine, under normal or increased pressure.

The complex metal compounds obtainable according to the present process are suitable for example for dyeing wool and silk; very fast shades being obtained thereby.

The following examples illustrate the invention, the parts being by weight unless otherwise stated:

Example 1

15.2 parts of 2-hydroxynaphthalene are dissolved in 4.8 parts of caustic soda solution and 60 parts of water. An aqueous paste containing 29.5 parts of the diazo compound of 4-nitro-2-amino-1-hydroxynaphthalene-6-sulfonic acid is introduced into this solution at 15–20° C., and coupling is effected at 30–40° C. until the diazo compound has disappeared. The whole is then diluted with concentrated common salt solution, and the new dyestuff is filtered and dried.

4.4 parts of the dyestuff thus obtained are dissolved in 90 parts of water and boiled for 24 hours in a reflux apparatus with a chromium formate solution containing 0.95 part of $Cr_2O_3$. The dyestuff is precipitated by addition of common salt. When dry it is a black powder which dissolves in water to a violet-black solution, in sodium carbonate solution of 10 per cent. strength and caustic soda solution of 10 per cent. strength to a blackish red solution, and in concentrated sulfuric acid to a grey-black solution. The dyestuff dyes wool black tints of good fastness.

The dyestuff can also be chromed under pressure, whereby the duration of the reaction is considerably shortened.

Example 2

15.2 parts of 2-hydroxynaphthalene are dissolved in 4.8 parts of caustic soda solution and 50 parts of water and at 15–20° C. the solution is mixed with 29.5 parts of 4-nitro-2-diazo-1-hydroxynaphthalene-8-sulfonic acid in the form of an aqueous paste. The mixture is stirred for a long time at 15–20° C. and the temperature is raised to 25° C. in order to complete the coupling. The reaction mixture is diluted with concentrated common salt solution whereupon the dyestuff is filtered and dried.

4.4 parts of the azo-dyestuff thus obtained are dissolved in 100 parts of water and mixed with a chromium formate solution containing 0.9 part of $Cr_2O_3$. The mixture is then heated for 6 hours to 125–130° C. After this time the formation of the chromium compound of the azo-dyestuff is complete. It is precipitated by addition of common salt, filtered, and dried.

The new chromiferous dyestuff is a grey-black powder which dissolves in caustic soda solution of 10 per cent. strength to a violet solution and in concentrated sulfuric acid to an olive-black solution. It dyes wool greenish black tints of good fastness.

*Example 3*

46.1 parts of the sodium salt of the azo-dyestuff from diazotized 4-nitro-2-amino-1-hydroxynaphthalene-6-sulfonic acid and 2-hydroxynaphthalene are dissolved in 1000 parts of water and heated to boiling for 24 hours with 80 parts of a normal chromium sulfate solution, corresponding with 11.4 parts of Cr₂O₃. After cooling the chromium compound has nearly completely precipitated. The whole is filtered, the dyestuff is dispersed in 500 parts of water and 20 parts by volume of a caustic soda solution of 40 per cent. strength by volume are added, whereby the dyestuff enters into solution. It is neutralized with acetic acid and the chromium compound precipitated by addition of common salt.

When dry it is a grey-black powder which dissolves in water to a blackish violet solution, in sodium carbonate solution of 10 per cent. strength to a blackish red solution, in caustic soda solution of 10 per cent. strength to a blackish blue-red solution and in concentrated sulfuric acid to a blue black solution. The new chromium compound produces on wool black tints of excellent fastness.

*Example 4*

46.1 parts of the azo-dyestuff from diazotized 4-nitro-2-amino - 1 - hydroxynaphthalene-8-sulfonic acid and 2-hydroxynaphthalene are dissolved in 1400 parts of water and heated for 6 hours to 128–133° C. with 65 parts of a normal chromium sulfate solution corresponding with 9.5 parts of Cr₂O₃. After cooling the precipitated chromium compound is filtered. It is dissolved in 500 parts of water with addition of 20 parts by volume of a caustic soda solution of 40 per cent. strength by volume, the solution is neutralized with dilute acetic acid, and the chromium compound precipitated by addition of common salt.

When dry it is a violet black powder which dissolves in water and sodium carbonate solution of 10 per cent. strength to a blackish violet solution, in caustic soda solution of 10 per cent. strength to a blackish blue-red solution and in concentrated sulfuric acid to a greenish blue-black solution. When dyed from a sulfuric acid bath the new chromium compound produces on wool black tint of excellent fastness.

*Example 5*

A dye-bath containing about 2500 parts of water is prepared with 4 parts of sulfuric acid of 66° Bé., and 100 parts of wool are handle in this bath at 60° C. during 10–15 minutes. 2 parts of the dyestuff obtainable according to Example 1 in aqueous solution are then added and dyeing is effected for ½ hour at 60° C. The bath is slowly heated to the boil and further 4 parts of sulfuric acid of 66° Bé are added, and boiling is continued for ½ to ¾ hour until the shade has completely developed. The wool is dyed fast black tints.

*Example 6*

For 100 parts of ordinary or loaded silk there are dissolved 2 parts of the dyestuff of Example 2 in the necessary quantity of boiling water. This solution and 6–8 parts of acetic acid are added to the dye-bath containing about 2500 parts of water and the goods to be dyed are entered at 50–60° C. The bath is slowly heated to 80° C. and kept at this temperature for ¾ to 1 hour. The goods are then washed, brightened in the usual manner and dried. The silk is dyed fast black tints.

What we claim is:

1. Process for the manufacture of metalliferous azo-dyestuffs, comprising causing agents yielding metal to react with azo-dyestuffs of the general formula

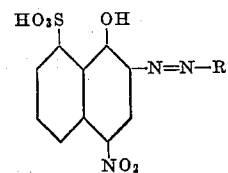

wherein R represents a 2-hydroxynaphthalene radical.

2. Process for the manufacture of metalliferous azo-dyestuffs, comprising causing agents yielding metal to react with azo-dyestuffs of the formula

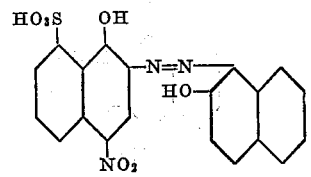

3. Process for the manufacture of chromiferous azo-dyestuffs, comprising causing agents yielding chromium to react with azo-dyestuffs of the general formula

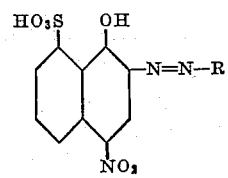

wherein R represents a 2-hydroxynaphthalene radical.

4. Process for the manufacture of chromiferous azo-dyestuffs, comprising causing agents yielding chromium to react with the azo-dyestuff of the formula

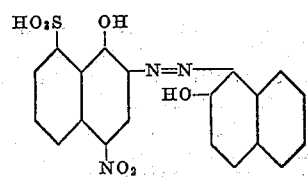

5. Complex metal compounds of azo-dyestuffs of the general formula

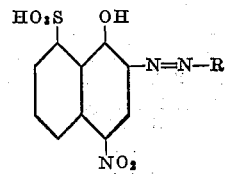

wherein R represents a 2-hydroxynaphthalene radical.

6. Complex metal compounds of the azo-dyestuff of the formula

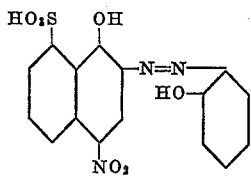

7. Complex chromium compounds of azo-dyestuffs of the general formula

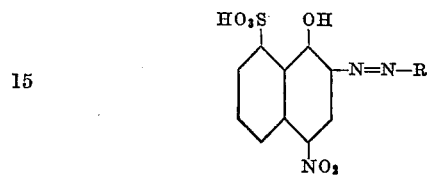

wherein R represents a 2-hydroxynaphthalene radical.

8. Complex chromium compounds of the azo-dyestuff of the formula

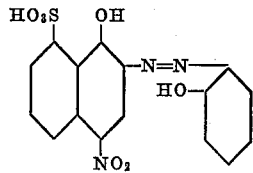

which chromiferous dyestuffs are violet to black powders, dissolving in water to blue to violet solutions, and dyeing wool green-black to black tints of good fastness.

FRITZ STRAUB.
PETER PIETH.
HERMANN SCHNEIDER.